United States Patent
Willsie et al.

[15] 3,654,013
[45] Apr. 4, 1972

[54] METHOD OF MAKING A FORMED AND BONDED PLASTIC SHEET STRUCTURE

[72] Inventors: Douglas A. Willsie, Waterloo; Ronald D. Habel, Kitchener; Robert D. Shepherd, Waterloo, all of Canada

[73] Assignee: Uniroyal, Inc., New York, N.Y.

[22] Filed: Apr. 14, 1969

[21] Appl. No.: 815,999

[52] U.S. Cl. ............................156/212, 156/201, 156/204, 156/272, 156/306, 156/311
[51] Int. Cl. .....................................B29c 27/02, C29c 7/00
[58] Field of Search............... 156/196, 201, 204, 209, 311, 156/212, 292, 306, 311, 461, 469, 311, 588, 580, 583, 594, 322, 352; 180/90; 296/70; 161/116

[56] References Cited

UNITED STATES PATENTS

| | | | |
|---|---|---|---|
| 2,524,584 | 10/1950 | Zehr | 156/204 |
| 2,679,469 | 5/1954 | Bedford | 156/580 X |
| 2,823,157 | 2/1958 | Hofferbert et al. | 156/311 X |
| 2,855,066 | 10/1958 | Nallinger | 280/150 B X |
| 2,924,545 | 2/1960 | Daly | 161/116 |
| 2,966,952 | 1/1961 | Wilfert | 280/150 B X |
| 3,048,514 | 8/1962 | Bentele et al. | 156/204 X |
| 3,070,195 | 12/1962 | Wilson | 156/580 X |
| 3,088,539 | 5/1963 | Mathues et al. | 280/150 B X |
| 3,162,564 | 12/1964 | Buchner | 156/583 X |
| 3,206,354 | 9/1965 | Pooley | 161/161 |
| 3,250,660 | 5/1966 | Greig et al. | 156/588 X |
| 3,462,330 | 8/1969 | Greig et al. | 156/306 X |

*Primary Examiner*—Willard E. Hoag
*Attorney*—Henry Sternberg

[57] ABSTRACT

A composite plastic structure is formed by heating a pair of heat formable plastic sheets to heat formable temperature, independently shaping the heated sheets on a pair of cooperating spaced mold members, moving the mold members together so as to place in contact therebetween sealed heat fusible portions of the sheets located between the mold members, and locally heating the contacting portions of the sheets so as to fuse the latter together.

21 Claims, 14 Drawing Figures

Patented April 4, 1972
3,654,013
3 Sheets-Sheet 1
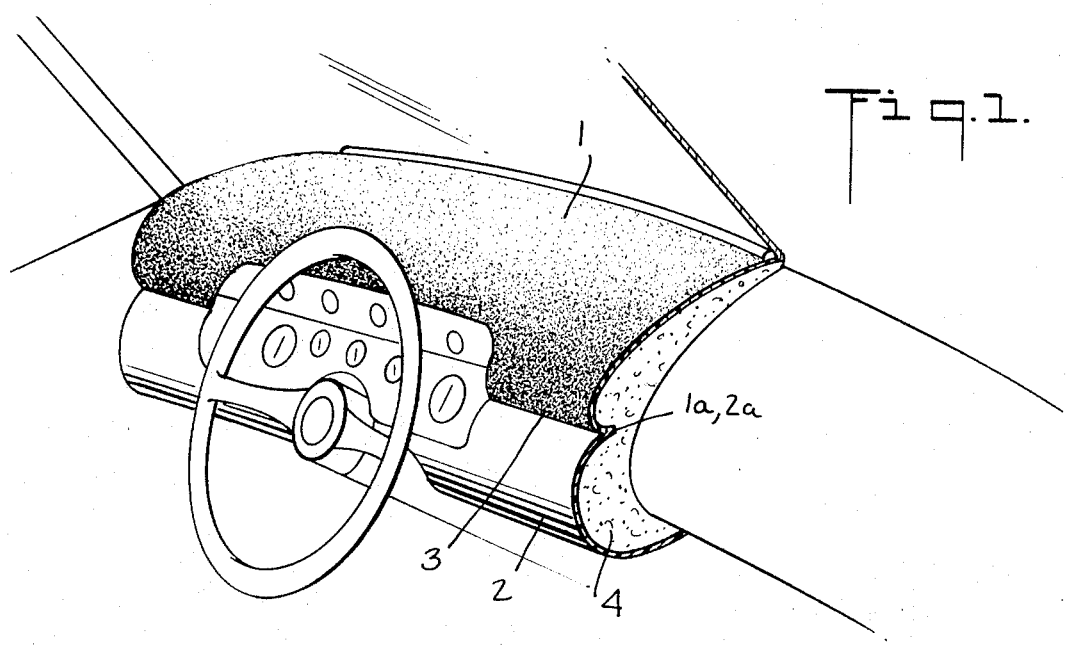
Fig. 1.
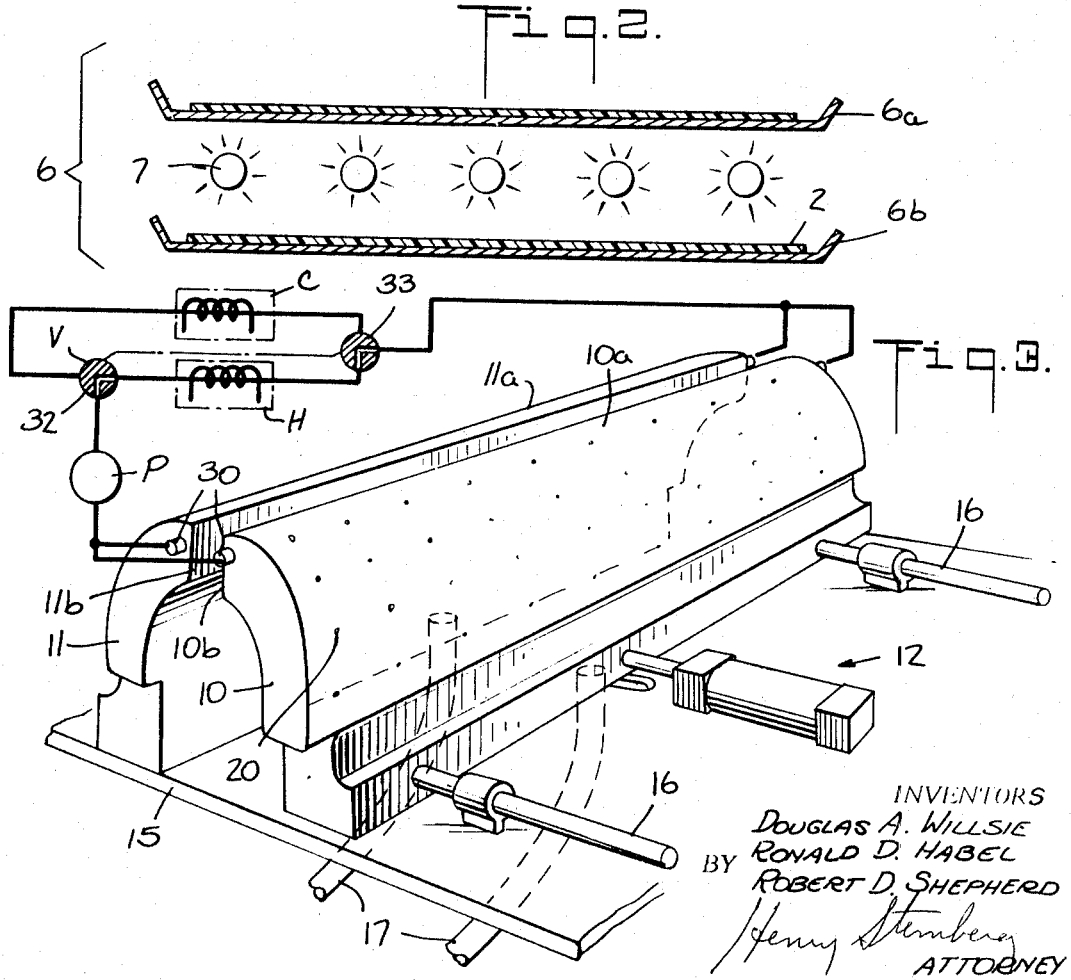
Fig. 2.
Fig. 3.
INVENTORS
DOUGLAS A. WILLSIE
RONALD D. HABEL
ROBERT D. SHEPHERD
BY Henry Sternberg
ATTORNEY

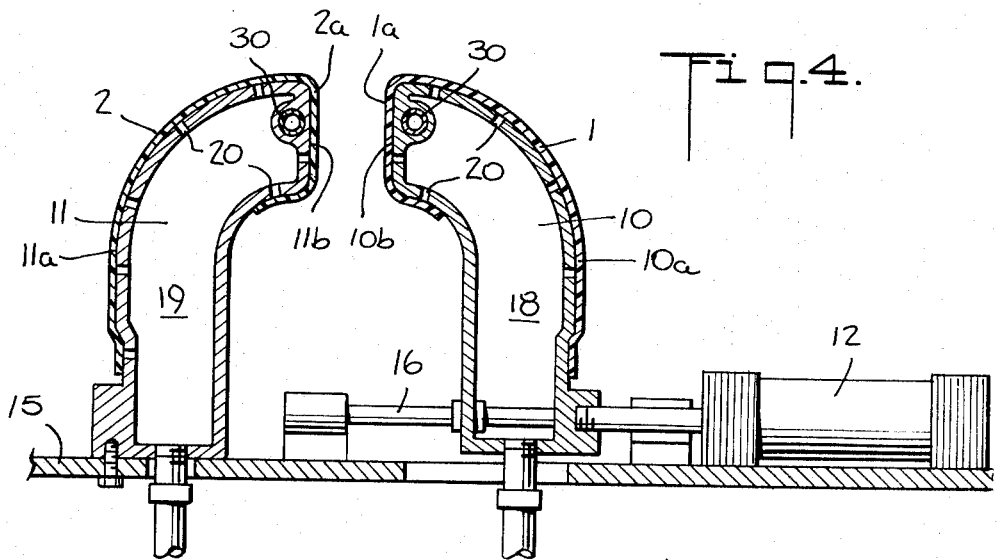
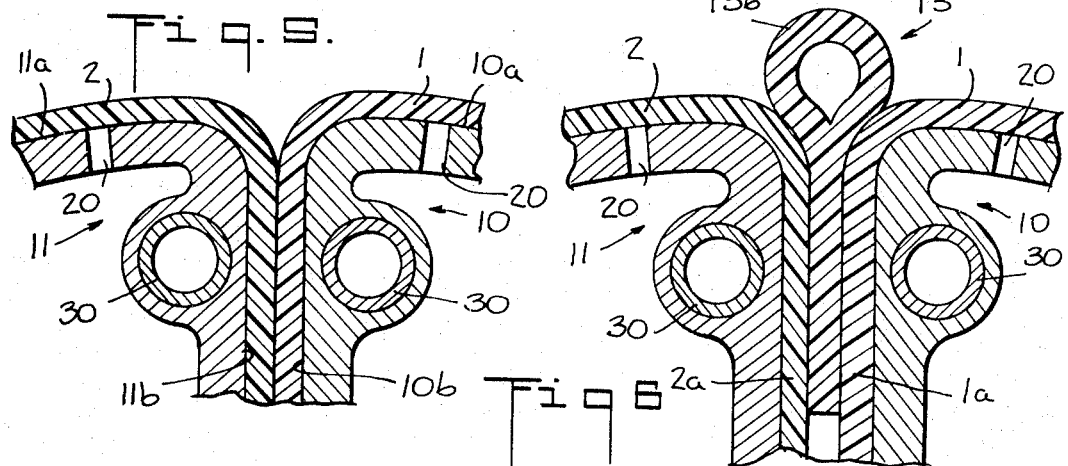
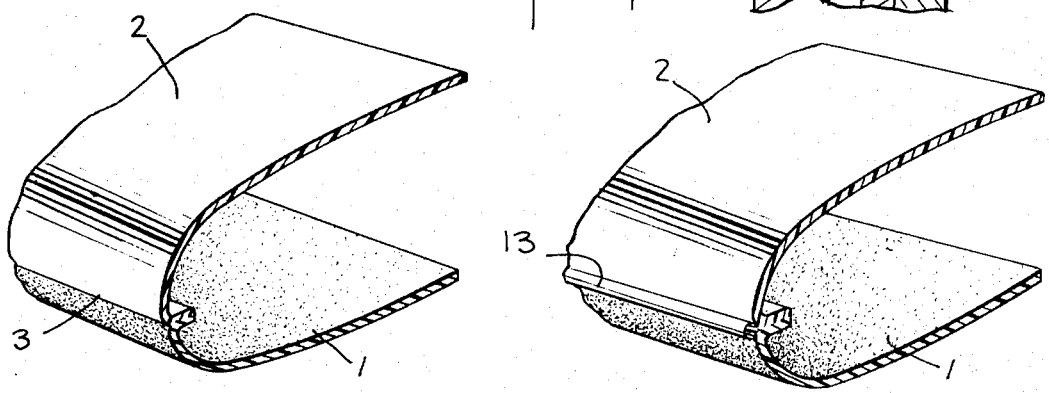

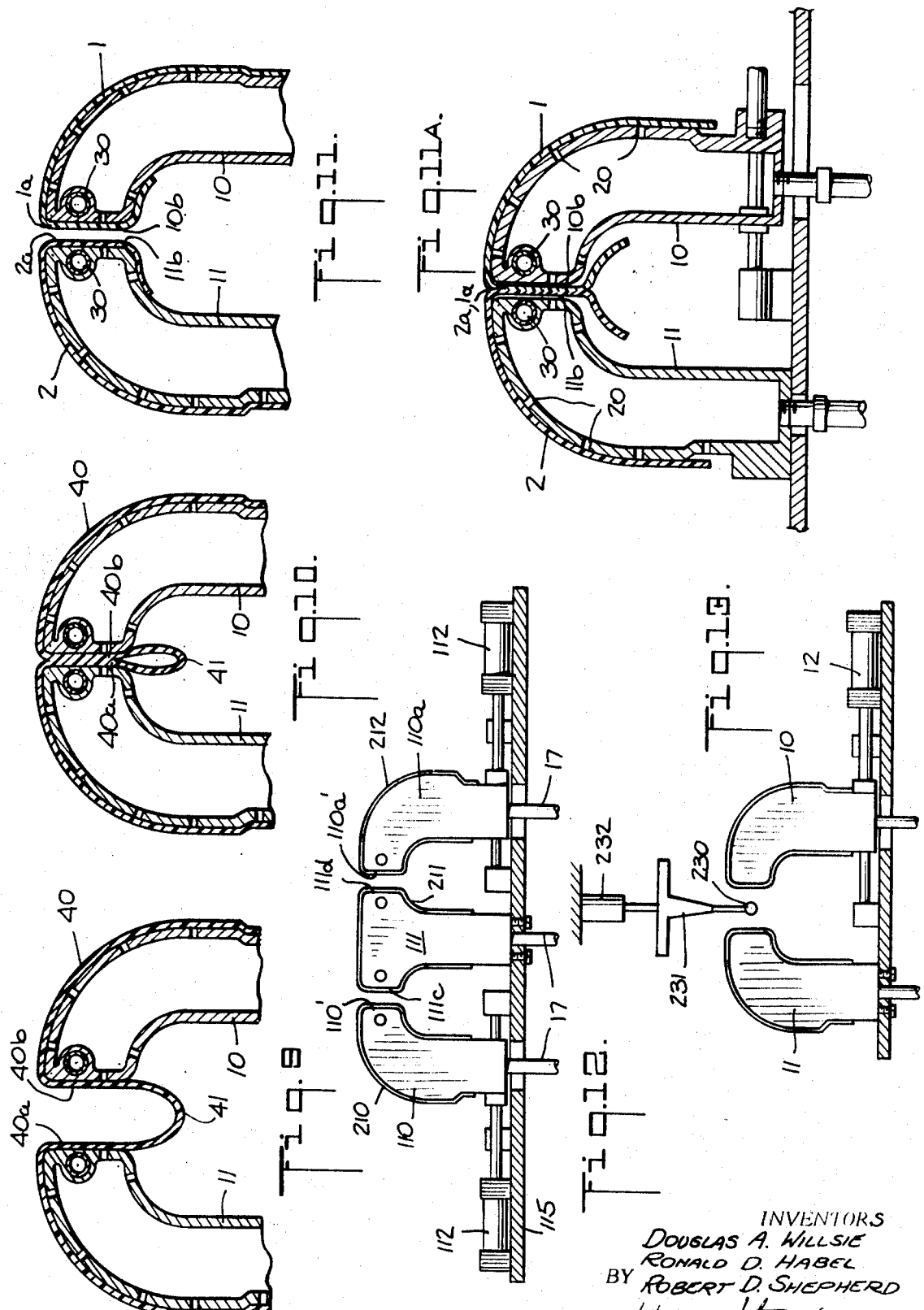

METHOD OF MAKING A FORMED AND BONDED PLASTIC SHEET STRUCTURE

This invention relates to an improved process for forming a shaped plastic skin structure, to the improved plastic skin structure as an article, and to apparatus employed in fabricating such structure.

The improved process of this invention is illustrated as particularly adapted for the formation of composite plastic structures, commonly of a skin-like character, and which may be embodied in various articles. For example, the process might be employed in the fabrication of a composite plastic skin structure forming the exterior of an instrument panel pad of the type used in the dash-board region of automobiles.

It is frequently desirable to form the exterior skin of the automobile instrument panel pad of at least two materials displaying different characteristics. Thus, it may be desirable to form such skin of, for example, two materials of different color, different texture, and/or having other dissimilar physical characteristics. It may, for example, be desirable to have the upper, i.e., generally horizontal portions of the instrument pad similar in color to the exterior of the automobile while the inwardly facing i.e., generally vertical portions of the instrument panel pad have a color and/or texture which blends with the color and/or texture scheme of the automobile interior.

Other advantages of the composite sheet structure include the obtaining of certain desired appearance characteristics by combining sheets of identical characteristics and the ability to overcome construction problems resulting from the complex shape and/or size of the finished product.

An important safety advantage of the composite sheet structure is that the upper surface of the pad can be made glare-free while the inwardly facing surface can display any desired texture and/or color which may be suitable for the interior decor of the automobile.

According to present methods, instrument panel pad structures are formed of a single sheet of thermoplastic material by heating the latter to heat formable temperature, draping the heated sheet over a male forming mold, applying sub-atmospheric pressure between the sheet and the mold surface for shaping the sheet, and stripping the shaped sheet from the male mold member after cooling. Such skin structure, being fabricated of a single sheet of plastic cannot, however, display, in different portions thereof, colors and/or textures different from those of the original sheet of plastic as fabricated. Under existing processes, therefore, in order to fabricate a multi-color or multi-textured skin, it has been necessary to paint or post-emboss or to form the plastic skin structure in two separate parts at one or more work stations and thereafter to join these separate parts at a different work station by cementing, heat sealing, dielectric sealing or stitching. It will be obvious that such separate operations at different work stations require considerably more labor and equipment than is presently required for fabricating the one-piece skin structure well known to the art. Furthermore, unless tedious precautions are taken, separate operations of this sort normally result in frequent misalignments of the different sheet portions during the additional operation.

It is, therefore, an object of the present invention to provide an economical method for forming a multi-color or multi-textured composite plastic structure.

It is another object of the present invention to provide an improved method for forming a composite plastic structure displaying a neatly defined boundary line between the differently colored and/or textured portions thereof.

It is a further object of the present invention to provide a composite plastic structure of the above type useful as the exterior skin of an automobile instrument panel pad and having light reflecting as well as nonreflecting surface portions.

It is still another object of the present invention to provide an apparatus useful in the fabrication of the above described skin structure.

A concomitant object of the present invention is to provide a method such as described above which will, in an economical manner, insure the accurate joining of a pair of plastic sheets with the result that the finished structure will display a uniform neatly defined juncture.

While it is known to form a pair of plastic sheets into a composite plastic structure using cooperating female mold members for forming the individual sheets into desired shape and for contacting preselected areas of these preheated sheets so as to fuse the latter together at these preselected contact areas, the presently known methods have many disadvantages and are particularly unsuited to the "drape-forming" of plastic skin materials on male mold members. See for example, U.S. Pat. No. 3,242,245 issued on Mar. 22, 1966 to J. W. Greig et al., wherein a pair of cooperating female mold members are used to respectively shape a pair of preheated plastic sheets. The plastic sheets are formed in female molds and fused together at their outer marginal edges. One disadvantage of using such process is that the fused edges necessarily result in an outwardly rather than an inwardly extending flanged portion. This is, of course, undesirable for skin structures forming the skin of an automobile instrument panel pad where it is not desirable to have a flanged juncture line between the two materials located at the interior of the automobile i.e. visible to the passengers. For instrument panel pads therefore, it is preferred to fabricate the skin structure with the fused marginal flanges of the materials extending inwardly i.e. at the concave side of the structure so as not to be visible from the interior of the automobile. Furthermore, the prior art requires a frame for holding the pair of sheets during insertion between the mold members and while the mold members move toward each other. Need for a frame device is, of course, eliminated when using "drape" molding techniques. It should also be noted that where, as in the prior art, the sheets are transported from a heating station to a forming station on a frame member, and are there drawn with a vacuum toward the mold surface there is always the risk, and it is a substantial one, that by the time the pair of molds are brought together, the plastic sheets will have been cooled to a temperature below their fusion temperature so as not to permit satisfactory fusion at the contact areas thereof.

A feature of the present invention is that the heating of the plastic sheet materials is done in two stages. First, the sheets are heated to heat forming temperature and later, while the sheets are still on the forming members, selected portions of the sheets are brought into contact with each other and are locally heated to a heat fusing temperature, namely, a temperature at which fusion will occur.

According to one embodiment of the method herein disclosed, after a pair of sheets are individually formed and while they are still positioned on the respective forming members the sheets are fused together at pre-selected contact areas thereof by bringing the latter together and by the localized application of additional heat to such contact areas. The continued support of the sheets on the respective forming members during fusion prevents a warping or disfiguration of the sheets as a result of the additional localized application of heat to the contact areas. Thin plastic sheets of different physical characteristics may thus be formed quickly and economically into a composite structure. The method according to the present invention results in an aesthetically pleasing composite skin structure having a uniform, well defined boundary line between the different sheets.

Since, according to the present invention, the fused flanged edges of the pair of sheets extend inwardly, i.e., at the concave side of the composite concavo-convex skin structure, these flanges ultimately extend into the polyurethane foam with which the skin structure is later filled in fabrication of an automobile instrument panel pad. There is thus provided a mechanical interlock between the exterior skin and the interior or foam of the instrument panel pad assembly which aids in preventing a shifting of the skin with respect to the foam fill.

The manner in which the invention accomplishes the foregoing objects, as well as additional objects and advantages, will be apparent from the following detailed description, which is intended to be read with reference to the accompanying drawings, wherein:

FIG. 1 illustrates a structure which may be fabricated according to the present invention and which is embodied in an instrument panel pad for an automobile;

FIG. 2 is a diagrammatic sectional view of a heating arrangement for initially heating the plastic sheets according to the present invention;

FIG. 3 is a diagrammatic perspective view of one embodiment of the molding apparatus according to the present invention;

FIG. 4 is a cross-sectional transverse view of a molding apparatus in accordance with the present invention showing one embodiment of the cooperating male mold members having plastic sheets draped and formed thereon;

FIG. 5 is a fragmentary sectional view showing, in enlarged scale, cooperating portions of the mold members in closed position, pressing preselected marginal portions of a pair of sheets therebetween;

FIG. 6 is a fragmentary sectional view showing, in enlarged scale, cooperating portions of the mold members in another closed position thereof, according to another embodiment suitable for fusing preselected marginal portions of a pair of sheets draped thereabout together with a third sheet member disposed therebetween;

FIG. 7 is a perspective view of a fragment of a composite structure fabricated in accordance with one embodiment of the present invention;

FIG. 8 is a perspective view of a fragment of a composite structure fabricated in accordance with another embodiment of the present invention;

FIGS. 9 and 10 are diagrammatic transverse sectional views of a mold assembly showing the mold members in spaced apart and in closed position, respectively, according to a still further embodiment of the present invention;

FIG. 11 is a fragmentary sectional view showing in enlarged scale, cooperating portions of the mold members in an intermediate position;

FIG. 11a is a fragmentary sectional view showing in enlarged scale cooperating portions of the mold member in article release position thereof;

FIG. 12 is a diagrammatic side elevational view of a further embodiment of the present invention having a three piece mold; and FIG.. 13 is a diagrammatic side elevational view of still another embodiment of the heating means according to the present invention.

Referring now to FIG. 1 of the drawings there is shown a portion of an automobile instrument panel pad assembly having a composite plastic skin structure according to the present invention. The illustrated composite skin structure is comprised of a pair of thermoplastic sheets 1 and 2 fused together at preselected marginal areas 1a and 2a thereof along a neatly defined boundary line 3.

It will be seen that since the marginal portions 1a and 2a are bent inwardly with respect to the concavo-convex composite skin structure there is visible at the convex side of the skin structure, i.e., the side which faces the interior of the automobile, only a uniform grooved line 3.

The sheets 1 and 2 preferably display different physical characteristics. For example, the color of the sheets and/or their texture or gloss may differ. Thus, for example, sheet 1 which is located at the upper i.e., generally horizontal portion of the crash-pad (FIG. 1) preferably comprises a material which has a non-reflecting i.e., glare-free surface, while a material which may more aptly matches the interior decor of the automobile may be used for the remainder of the instrument panel pad skin structure, namely, sheet 2.

After the instrument panel pad skin structure is formed in the manner to be described in detail hereinbelow it is filled, by well known methods, with a resilient foam material 4 which fills out, and assumes the shape of, the plastic skin structures and thus permits the fully assembled instrument panel pad (FIG. 1) to protect auto passengers against bodily injury in case of an accident.

FABRICATION OF SKIN STRUCTURE

According to the present invention the thermoplastic sheets 1 and 2 are initially heated, preferably in an oven, generally denoted with reference numeral 6 (FIG. 2). The oven 6 may be of well-known construction and may be provided with, for example, a series of heating sources which may be in the form of lamps 7. The individual sheets 1 and 2 may be supported on trays 6a and 6b respectively, during the time they are in the oven, or they may be carried through the oven, in a timed cycle, by a conveyor member or other similarly suitable means. As they emerge from the oven 6 the sheets are at least slightly above their heat-forming temperature, so that during the forming operation, which will now be described, the sheets have not yet cooled substantially below the temperature at which they are readily heat formed. The specific temperature required depends, of course, on the heat-forming characteristics of the specific sheet materials involved. For the preferred materials, namely plasticized ABS/vinyl blend (having the composition and being within the thickness ranges described below) the preferred heat forming temperature is in the range of approximately 325° F. to 375° F. Preferably these sheets are initially heated to a temperature of approximately 385° F. so that they will be at an approximate temperature of 375° F. at the time they are draped over the mold members as described below. The temperatures required for heat forming all of the plastic materials described below are well known to those skilled in the art and all of these need therefore not be individually listed herein.

After the sheets have been heated in oven 6 to their heat-formable temperature they are draped (FIG. 4) over the respective male mold members 10 and 11 (FIG. 3). The draping is such that each of the sheets 1 and 2 will have a selected marginal edge portion 1a and 2a thereof, respectively, located in the space between the spaced mold members 10 and 11. Sub-atmospheric pressure is then provided between the surfaces of the mold members 10 and 11 (FIG. 4) and the sheets supported thereon, respectively, to form the pre-heated sheets into the shape of their supporting mold members. The movable mold member 10 is next moved toward the fixed mold member 11 by the actuator means 12 until the opposed marginal edge portions 1a, 2a (FIG. 5) contact each other with the required amount of pressure. Additional heat is then supplied locally to the opposed contact areas 1a, 2a of the sheets located between the mold members 10 and 11, so as to raise the temperature of the aforesaid contact areas at least to the heat-fusible temperature of the particular thermoplastic materials involved. For the preferred plasticized ABS/vinyl blend sheets herein described, such heat fusible temperature is in the range of approximately 325° F. to 375° F.

After the flanged portions 1a and 2a are fused together, in the manner described above, preferably to an extent in which they form a cohesive inwardly extending tab, the region of fusion is rapidly cooled, so as to permit the fused material to set. Meanwhile, the remaining portions of the now shaped sheets 1 and 2 have also been cooled — for example by passing streams of cold air over the surface of the formed sheets — and set. As soon as the now joined sheets have set in their newly assumed shapes, the opposite end portions and the lower marginal edge portions of the composite skin structure are peeled upwardly and the mold members 10 and 11 are moved a short distance relatively apart to an intermediate, article release, position (FIG. 11a). This intermediate position is such as to permit the fused flanged portion of the structure to be withdrawn from between the mold members so as to permit the entire skin structure to be stripped from the mold. Thereafter, the flanged portions may be trimmed to remove excess marginal material extending beyond the fused areas. The skin structure is now ready to be filled with foam material.

In accordance with another embodiment of the present method, after draping of the sheets 1 and 2 as stated above, the movable mold member 10 is moved toward the fixed mold member 11 but not so far as to provide pressure contact between the areas 1a and 2a. Instead, the movable mold member 10 is moved from the spaced apart position of FIG. 4 to the intermediate position illustrated in FIG. 11, in which the facing surface portions of the contact areas 1a and 2a of the plastic sheets formed on, and located between, the pair of mold members, are spaced slightly further apart than shown in FIG. 6. A third sheet member 13, preferably comprising an elongated bead portion 13b and an integral longitudinally extending tail portion 13a, is then positioned with respect to the said sheets 1 and 2 with the tail portion 13a thereof slipped between the spaced opposing contact areas 1a and 2a of the sheets 1 and 2. The movable mold member 10 is then moved from this intermediate position further toward the fixed mold member 11 until the latter provides suitable contact pressure for pressing together the three sheet portions 1a, 2a and 13a located therebetween. It should be noted that the aforesaid intermediate position (FIG. 11) is chosen such that the bead portion 13b will not be able to slip through between flanged portions 1a and 2a but rather will be supported thereon in substantially the position illustrated in FIG. 6. The localized application of additional heat by a heating means 30 results in fusion of the tail portion 13a of the third sheet member 13 with the respective contact areas 1a and 2a of the sheets 1 and 2 so as to form a cohesively fused boundary strip bonding together the three sheet members. The piping 13 thus becomes an integral part of the composite skin structure. The bead portion 13b extends along the groove formed at the exterior juncture line between the pair of sheets 1 and 2 and is located at least partially within such groove (FIG. 6). This produces a pleasing appearance similar to that produced by piping commonly found on upholstered furniture while serving to neatly separate the materials of different physical characteristics which make up the composite skin structure. While the third sheet member 13 is preferably also a thermoplastic material, it will be understood that this is not necessarily the case. Since, the sheets 1 and 2 are each thermoplastic the sheet member 13 could be some other material such as, for example, cloth having an open weave or similar characteristic which will permit the mechanical locking thereto of the heat fused materials of sheets 1 and 2.

There are numerous plastics which lend themselves to fabrication into composite skin structures as set forth herein. For example, plasticized ABS/vinyl lend sheets of the following typical formulation have been found suitable:

|  | % |
|---|---|
| ABS Resin | 45 |
| Vinyl Resin | 35 |
| Plasticizer | 10 |
| Stabilizer | 5 |
| Color Pigment | 5 |

Other thermoplastic compositions which are suitable are: ABS (acrylonitrile-butadiene-styrene), fluorocarbon, nylon, polycarbonate, polyethylene, polypropylene, polysulfone, polystyrene, styrene-butadiene, and thermoplastic urethane including alloys and copolymers of the above which may be modified as is well known in the art with plasticizers, rubbers, fillers, stabilizers or other additives to improve properties.

Typical processing conditions for three preferred materials are as follows:

| Sheet Type | Gauge | Forming Temp. | Fusing Temp. |
|---|---|---|---|
| Plasticized ABS/Vinyl | .030"–.045" | 325°–375°F. | 325°–375°F. |
| Plasticized Vinyl | .025"–.040" | 275°–325°F. | 275°–325°F. |
| Polypropylene | .015"–.030" | 275°–325°F. | 275°–325°F. |

APPARATUS

FIGS. 3 and 4 show a forming tool comprising a pair of male forming members 10 and 11 each having a first, outer surface 10a, 11a respectively and a second, inner surface 10b, 11b, respectively. The outer surface portions 10a and 11a face away from each other while the inner surface portions 10b, 11b face toward each other.

The male forms or molds 10 and 11 are arranged so as to be relatively movable toward and away from each other. In the preferred embodiment of the apparatus, the mold member 11 is fixed to a stationary support member 15 on which latter there is slidably supported the movable mold member 10. A reciprocable actuator means, preferably in the form of a conventional air-cylinder arrangement 12 and having a pair of guide rods 16 associated therewith, is provided for moving the mold member 10 toward and away from the stationary cooperating mold member 11. Suitable controls (not shown) are provided for controlling the movement of actuator means 12 such that mold member 10 is movable for fabrication of a structure 1, 2 such as shown in FIG. 7 between a first position (shown in FIG. 5) in which the inwardly facing surface portion 10b thereof is closely spaced from portion 11b and a second position (shown in FIG. 4) in which the inwardly facing surface portions 10b and 11b are spaced further from each other than in said first position thereof. For removal of the composite skin structure (FIG. 7) from the mold, a third position (FIG. 11A) intermediate the first and second aforesaid positions, is achievable with the means 12.

For fabrication of a structure 1, 2, 3 such as shown in FIG. 8, on the other hand, the mold member 10 is movable between a first position (shown in FIG. 6) in which the inwardly facing surface portions 10b are suitably closely spaced from each other to press the layers 1a, 2a and 13a of plastic material therebetween and a second position (shown in FIG. 4) in which the inwardly facing surface portions 10b and 11b are spaced further from each other than in said first position thereof. For insertion of the tail strip 13a of the bead member between the areas 1a and 2a and later for removal of the composite skin structure of FIG. 8 from the mold, a third position (FIG. 11) exceeding in opening said FIG. 6 position is achievable with suitable controls (not shown) for controlling the means 12.

Each of the male forms 10, 11 is further provided with a suitable fluid pressure differential means such as, for example, a vacuum means comprising conduits 17 communicating with the interior of chambers 18, 19 of the preferably hollow mold members 10 and 11 for providing therein a sub-atmospheric pressure. The inner chambers 18, 19 of the hollow forms, in turn, communicate with the atmosphere at the exterior surfaces of the respective mold forms by means of a plurality of suitable openings 20 which extend through the walls of the hollow mold members and cooperate with the vacuum means for drawing against the outer surfaces of the mold members the plastic sheets draped thereover.

Associated with the mold members 10 and 11, are heating means (FIG. 3) suitable for locally supplying heat to the flanged sheet portions 1a and 2a so as to maintain the latter at their heat-fusible temperature, including, if necessary, to raise the latter to such temperature. These heating means may, for example, take the form of a pair of conduits 30 passing through the mold members 10 and 11 in the regions thereof which are adjacent the inwardly facing surface portions 10b and 11b respectively. These conduits are adapted to be supplied from a suitable source H of heated fluid such as, for example, hot oil. The oil is heated at H with suitable heater means to a temperature sufficiently high to supply to the surfaces 10b and 11b that amount of heat which is necessary to cause fusion of adjacently located plastic sheet portions 1a and 2a. By way of suitable control valves 32 and 33 which may be mechanically connected with one another for operating in unison, the aforesaid conduits 30 may rapidly be connected alternately with said source of hot oil H and with a suitable source of cooled oil C; the latter, for quickly reducing the temperature of the inwardly facing surface portions of the mold members after fusion of the plastic flanges. Thus, for example, hot oil from source H may be supplied to the conduits 30 via a suitable pump P for elevating the temperature of the inwardly facing surface portions of the mold members to fusion temperature of the plastic materials located therebetween. After fusion, the pump P may again be actuated and the valves 32 and 33 switched to their other positions so that the hot oil may be quickly evacuated from the conduits 30, 30 and rapidly replaced by cooled oil from source C for setting the fused plastic prior to removal of the finished structure from the mold. Suitable conduits may be provided to return the oil from conduits 30, 30 to the respective heating and cooling means H and C.

Alternatively, the heating means may comprise, instead of oil conveying conduits, electric heating elements or electrodes for dielectric heating (not shown) positioned in the regions of the mold members 10 and 11 adjacent the inwardly facing surface portions 10b, 11b thereof. Suitable controls and a source of power may be provided for energizing and de-energizing the electrodes. Cooling means may be provided for rapidly locally cooling the locally heated region of the mold members so as to permit the fused sheet portions 1a and 2a to set preparatory to removal from the mold. The cooling means may be in the form of conduits adjacent the electrodes through which may be passed a cooling medium, such as brine, cooled in a suitable refrigeration device. Alternatively the electrodes may be hollow so as to form the conduits through which such suitable cooled brine solution may be pumped.

Thus, in the process according to the present invention, preferably a pair of plastic sheets 1 and 2 are heated to heat-formable temperature and then draped over a pair of male forms 10 and 11, respectively, with marginal edge portions 1a and 2a located in the space between the mold form. With the sheets heated to heat-formable temperature and draped over the male forms, they are acted upon by fluid pressure differential means 17 which according to the preferred embodiment are such as to produce a sub-atmospheric pressure to draw the sheets against the respective mold surfaces for giving the sheets their desired shape. While the sheets are thusly supported on the mold members, the pair of cooperating mold members are moved relatively toward each other for contacting the sheets along selected opposed heat fusible areas thereof, namely, portions 1a, 2a. As will be apparent to those skilled in the art, the closed position (FIG. 5) of the mold members will be such as to provide sufficient contact pressure between the selected opposed heat-fusible areas of the plastic sheets located between the mold surfaces 10b, 11b as may be required for proper heat fusion thereof. Pump P is energized prior to or simultaneously with the mold members reaching their closed position (FIG. 5) with valves 32 and 33 in the position shown in FIG. 3, for locally applying additional heat to the heat-fusible contact areas 1a, 1b of the sheets so as to heat the latter to and/or maintain the latter at heat-fusible temperature thereby fusing the sheets together throughout their heat-fusible contact areas. This heating, it will be seen, and the fusion process resulting therefrom, are accomplished while the plastic sheets 1 and 2 are still retained by vacuum in their forming position on the surfaces of the forms 10 and 11. After the contact areas of the sheet members are fused together in this manner, valves 32 and 33 are rotated to their opposite positions for preventing further heated oil from entering conduits 30, 30, and for rapidly replacing the heated oil in conduits 30, 30 with cooled oil from source C so as to rapidly locally cool the fused contact areas of the sheets whereby the plastic material of the latter is permitted to set. The fluid pressure-differential means 17 is then disconnected and atmospheric pressure, or, if preferred, a small positive pressure, is then supplied to the interior 18, 19 of the mold members. The mold members are thereafter slightly separated sufficiently to release pressure on the fused marginal portions of the sheets located therebetween (FIG. 11A). The composite formed skin structure may then be removed, i.e., stripped from the forms in the usual manner. It will be seen that the separating of the mold members for permitting removal of the composite structure need only be such as suffices to release the pressure of the mold members on the fused contact areas of the sheets.

The fluid pressure means for evacuating the chambers 18 and 19 may comprise a conventional vacuum pump (not shown) and suitable conventional valve means (not shown) which latter are adapted to admit or block subatmospheric pressure from the pump to the chambers and also for venting the chambers to the atmosphere.

It has been found that by maintaining sub-atmospheric fluid pressure in the chambers 18 and 19 and thus holding the sheets tightly against the mold surfaces of the mold members during the localized heating of the contact areas for fusing the latter together, deformation of the sheets during the fusion process is prevented. Thus, in accordance with the present invention the heating to fusion temperature and the actual fusion of the plastic materials is accomplished in a localized manner and at a time when the remaining spaced portions of the sheets are retained in formed position i.e., tightly held against the respective mold surfaces of the forming members and in fact already in partly set condition. It will be understood that the surfaces of the cooperating male forms may be shaped to exhibit any desired contours for imparting to the plastic sheets any desired shape and that while a horizontal juncture line 3 has been illustrated (FIG. 1) there may be formed according to the present invention any type of juncture line such as for example a vertical, an arcuate or a combination of vertical, horizontal, inclined or arcuate juncture.

It will be apparent that, as illustrated in FIGS. 9 and 10 there may be fabricated, in accordance with the method and apparatus of the present invention, a skin structure comprised of a single sheet 40 of plastic material. After heating, the sheet 40 is draped over both of the spaced apart mold members 10 and 11 with a central portion of sheet 40 draping, in the form of a fold 41, between the mold members. After suction is applied for drawing respective spaced portions of sheet 40 against corresponding surface portions of molds 10 and 11, the latter are moved relatively toward each other till proper pressure contact between selected opposed areas 40a and 40b of the fold portion 41 is established. These areas are then fused together, in the manner already described, by the localized application of additional heat.

FIG. 12 illustrates a further embodiment of the present invention. According to this embodiment three or more sheets 210, 211 and 212 of heat formable plastic material may be formed on separate mold members 110, 111 and 110a. While in the illustrated embodiment the intermediate mold member 111 is shown to be fixed and the outer pair of mold members 110 and 110a are shown to be movable, it will be apparent to those skilled in the art that other constructions are possible within the scope of this invention. Thus, for example, one of the outer mold members could be fixed and the other outer as well as the intermediate mold member could both be supported for movement toward the fixed outer mold members. In the latter construction (not shown) a single actuator 112 connected to the movable one of the outer members would suffice.

As shown in FIG. 12 a pair of actuators 112, similar to the means 12 previously described, are adapted to move the members 110 and 110a toward and away from fixed member 111. Each of the mold members is provided with suitable suction means 17 for forming the respective sheet thereon. Intermediate mold member 111 defines a pair of second surface portions 111c and 111d which are opposed, respectively, to second surface portions 110' and 110a' of members 110 and 110a. Movement of members 110 and 110a toward the fixed mold member 111 causes the heat-fusible contact areas of sheets 211, 210 and 212 located between the respective second portions 110', 111c and 110a', 111d, respectively to come into contact and to be fused, in response to the local application of additional heat, via, for example, the pair of electrodes 130 on mold member 11 and/or the additional electrodes 130a on the mold members 110 and 110a.

It will be apparent that alternate arrangements for locally supplying said additional heat to the heat fusible contact areas of the plastic sheets may be used and that such arrangements are intended to be included in the scope of this invention. One such alternate arrangement, for example, is illustrated in FIG. 13 and includes a heating element such as, for example, an electrode 230 supported on a movable frame 231 and shown in its lowermost position. Frame 231 is in turn supported for vertical movement on an actuator 232 of conventional design. The control arrangement for actuator 232 is such as to retract the electrode 230, carried on frame 231, vertically out of the space between the opposed surface portions of mold members 10 and 11 in response to closing of the mold.

As hereinabove set forth, it is apparent that the process described is applicable to the fabrication of various structures embodying the invention. It is likewise apparent that these structures may require plastic sheet materials of different physical characteristics. The plastic sheets will be heat-formable and at least the contact regions thereof will be heat-fusible i.e., they will, of course, be of a thermoplastic nature but certain of their physical characteristics might differ. For example, they may differ in color, texture, gloss, thickness, design or composition.

While the preferred embodiment of this invention has been described herein, it will be understood that changes and details thereof may be made without departing from the spirit of this invention, and it is intended to cover all those changes which come within the scope of the appended claims.

What is claimed as new and desired to be protected by Letters Patent is:

1. In a method of forming a pair of thermoplastic sheets, at least one surface characteristic of which is different, into a composite concavo-convex skin structure, the steps of:
   heating each of the plastic sheets to a temperature at which it is formable;
   draping each of the heated sheets over a corresponding one of a pair of spaced-apart relatively shiftable cooperating mold members with opposed marginal areas of the sheets located in the space between the mold member while the remaining portions of said sheets are located outside said space;
   forming the plastic sheets on the respective mold members so that each will assume the shape of surface portions of the corresponding mold members;
   thereafter advancing said cooperating mold members relatively toward each other for moving said opposed areas of said sheets into pressure contact with each other; and
   applying additional heat to said contacting opposed areas of said sheets thereby fusing the sheets together throughout said contact areas while continuing to support said sheets, in shaped condition, on said mold members.

2. In a method of forming a seamed, shaped, plastic skin structure of a single sheet of thermoplastic material, in combination:
   heating the thermoplastic sheet to a temperature at which it is formable;
   supporting spaced portions of said sheet on spaced surface portions of a pair of cooperating relatively shiftable, spaced apart mold members, respectively, with a folded portion of said sheet draped between said spaced mold members;
   forcing said spaced portions of said heated sheet against said surface portions of said mold members, respectively, for conforming said spaced portions of said heated sheet to the shape of said mold surface portions;
   advancing said cooperating mold members relatively toward each other for pressing therebetween said folded portion of said sheet whereby opposed areas of said folded portion of said sheet are pressed into contact with each other; and
   locally heating said contacting opposed areas of said folded portion of said sheet for fusing the latter together so as to form a seam, while continuing to support said spaced portions of said sheet, in shaped condition, on said mold members.

3. In a method of forming a composite plastic structure from at least two thermoplastic sheets, the steps of:
   heating the sheets to a temperature at which they are formable;
   forming said heated sheets into predetermined shapes on respective ones of a cooperating pair of spaced-apart relatively shiftable mold members, said sheets having opposed contact areas thereof located in the space between said mold members;
   advancing said cooperating mold members relatively toward each other for moving said opposed contact areas of said sheets into contact with each other while maintaining the remaining portions of said pair of sheets out of contact with one another; and
   supporting said sheets in said predetermined shapes on said mold members while locally supplying additional heat to said contact areas of said sheets for heating said contact areas to heat-fusible temperature, whereby the sheets are fused together throughout said contact areas thereof while distortion of said predetermined shapes in response to said localized heating is substantially prevented.

4. The method according to claim 3, wherein each of said mold members has a generally convex mold surface, said step of forming said heated sheets comprising the steps of draping said heated sheets over the convex mold surface of the respective mold members and thereafter forcing each of said heated sheets against corresponding mold surface portions of the respective mold members whereby each sheet will assume substantially the shape of the corresponding mold surface portion.

5. The method according to claim 3 further comprising cooling the composite fused structure, said cooling comprising relatively rapidly cooling the fused selected contact areas of said sheets while permitting the remaining portions of said fused sheets to cool at a slower rate.

6. The method according to claim 3 wherein said step of forming said heated sheets on said mold members into predetermined shapes comprises producing a sub-atmospheric pressure between each of said sheets and the corresponding surface portions of the corresponding mold member to draw the respective sheet into contact with the corresponding mold surface portion for substantially conforming said heated sheets to the shape of such corresponding mold surface portions.

7. The method according to claim 3 wherein said step of heating said plastic sheets comprises heating each of a pair of heat-formable plastic sheets of different physical characteristics to its heat-formable temperature.

8. The method according to claim 3 wherein said step of supplying said additional heat comprises electrically heating said contact areas of said sheets, said method further comprising cooling said contact areas after fusion thereof.

9. The method according to claim 3 further comprising cooling the contact areas of said sheets after fusing thereof and removing the composite formed plastic structure from said mold members.

10. The method according to claim 11 wherein said step of removing the composite formed structure from said mold members comprises slightly separating the pair of mold members and removing from therebetween the fused together contact areas of said sheets.

11. The method according to claim 3 wherein said step of supplying additional heat to said contact areas of said sheets comprises passing a fluid medium at elevated temperature through conduit means provided in said mold members adjacent said contact areas of said sheets.

12. The method according to claim 11 further comprising locally cooling said fused areas of said sheets, after fusion thereof, by rapidly replacing said fluid medium in said conduit means with a fluid medium at a substantially lower temperature.

13. The method according to claim 3 wherein said heating of said plastic sheets to the temperature is performed at a first location spaced from said pair of cooperating mold members, said method further comprising transporting each of said heated sheets from said first location to the respective one of said pair of cooperating mold members, said mold members being in the shape of male mold forms and said step of forming each of said heated sheets into a pre-determined shape comprising draping said sheets over a corresponding one of said pair of male mold forms.

14. The method according to claim 13 wherein said sheets are draped over said male mold forms with opposed marginal edges of said sheets located in the space between said mold members.

15. The method according to claim 3 wherein said step of heating said plastic sheets to the temperature at which they are formable comprises initially heating said sheets in their entirety to a temperature within the range of approximately 325° F. to 375° F., and said step of locally supplying additional heat to said contact areas of said sheets comprises localized heating of substantially only said contact areas of said sheets to a temperature within the range of approximately 325° F. to 375° F.

16. The method according to claim 15 wherein said plastic sheets are comprised of ABS/vinyl blend material, said initial heating being to a temperature of approximately 375° F. and said additional heating being to a temperature of approximately 375° F.

17. The method according to claim 3 wherein said step of locally supplying said additional heat comprises providing a source of heat in the space between said contact areas of said pair of sheets while said mold members are in spaced apart condition, and advancing said source of heat out of said space prior to bringing said contact areas of said sheets into contact with each other.

18. The method according to claim 17 wherein said step of advancing said source of heat out of said space comprises advancing said source of heat in a direction transverse to and substantially simultaneously with the relative movement toward each other of said cooperating mold members.

19. The method according to claim 3 further comprising placing a third plastic sheet between said first two mentioned plastic sheets prior to moving the latter into contact with each other between said mold members, so that when said cooperating mold members are advanced relatively toward each other said opposed contact areas of said first mentioned pair of sheets respectively contact opposite sides of said third plastic sheet at areas mentioned pair of sheets respectively contact opposite sides of said third plastic sheet at areas where said sheets are to be heat sealed together, whereby all three sheets are fused together, throughout said contact areas of each, i response to the application of said additional heat.

20. The method according to claim 19 wherein said step of advancing said cooperating mold members relatively toward each other comprises advancing said cooperating mold members relatively with respect to each other between a first position in which said contact areas of said first mentioned pair of plastic sheets located between said mold members are spaced from each other a given distance substantially greater than the thickness of said third sheet, an intermediate position in which said contact areas of said pair of plastic sheets are spaced closer to each other than in said first position of said mold members said spacing in said intermediate position being only slightly greater than the thickness of said third sheet so that the latter may be positioned between said contact areas of said first mentioned pair of sheets, and a final position in which said opposed contact areas of said pair of sheets are pressed against opposite sides respectively of said third plastic sheet positioned therebetween.

21. The method according to claim 20 wherein said third plastic sheet is in the form of an elongated bead having integral therewith a longitudinally extending tail portion said selected heat-fusible areas of said third sheet, said step of placing said third sheet between said contact areas of said pair of sheets comprising inserting said tail portion between said opposed contact areas of said pair of plastic sheets so that said tail portion will be fused to said opposed areas of said pair of plastic sheets and said bead portion will extend along and cover the juncture line between said three fused sheets.

* * * * *